United States Patent
Shigyo

(10) Patent No.: US 6,878,095 B2
(45) Date of Patent: Apr. 12, 2005

(54) AUTOMATIC-CLUTCH CONTROL SYSTEM OF AUTOMATIC CLUTCH TYPE TRANSMISSION

(75) Inventor: Hidetoshi Shigyo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/263,960

(22) Filed: Oct. 4, 2002

(65) Prior Publication Data

US 2003/0078137 A1 Apr. 24, 2003

(30) Foreign Application Priority Data

Oct. 22, 2001 (JP) .................................. 2001-323235

(51) Int. Cl.[7] .............................................. B60K 41/02
(52) U.S. Cl. ....................... 477/86; 477/175; 477/176
(58) Field of Search ........................... 192/103 C, 52.4, 192/3.63, 13 R; 477/86, 176, 175

(56) References Cited

U.S. PATENT DOCUMENTS

| | | | | |
|---|---|---|---|---|
| 4,732,248 A | * | 3/1988 | Yoshimura et al. | 192/13 R |
| 4,799,160 A | * | 1/1989 | Arbeille et al. | 477/175 |
| 4,924,983 A | | 5/1990 | Katayama et al. | |
| 4,958,495 A | * | 9/1990 | Yamaguchi | 60/468 |
| 5,277,286 A | * | 1/1994 | Yamamoto et al. | 477/175 |
| 5,535,863 A | * | 7/1996 | Vukovich et al. | 477/176 |
| 5,634,867 A | * | 6/1997 | Mack | 477/86 |
| 5,679,099 A | * | 10/1997 | Kato et al. | 477/176 |
| 5,733,223 A | * | 3/1998 | Matsubara et al. | 477/175 |
| 5,807,209 A | * | 9/1998 | Matsubara et al. | 477/176 |
| 5,816,979 A | * | 10/1998 | Shiiba et al. | 477/176 |

FOREIGN PATENT DOCUMENTS

| | | | | |
|---|---|---|---|---|
| CA | 2 339 452 A1 | | 10/2001 | |
| DE | 196 03 239 A1 | | 7/1997 | |
| DE | 198 27 003 A1 | | 12/1999 | |
| JP | 357160731 | * | 10/1982 | ........... B60K/41/28 |
| JP | 360252828 | * | 12/1985 | ........... F15D/25/14 |
| JP | 62-225427 A | | 10/1987 | |
| JP | 404087841 | * | 3/1992 | ........... B60K/41/22 |
| JP | 5-202951 A | | 8/1993 | |
| JP | 6-117456 | | 4/1994 | |
| JP | 7-96778 A | | 4/1995 | |
| JP | 11-241737 A | | 9/1999 | |
| JP | 2000-88010 A | | 3/2000 | |

\* cited by examiner

Primary Examiner—Dirk Wright
(74) Attorney, Agent, or Firm—Foley & Lardner LLP

(57) ABSTRACT

An automatic-clutch control system of a transmission for a vehicle is arranged to calculate a deceleration of the vehicle when shifting is not being executed, when an automatic shift mode is being selected, when an idle switch is set at ON state, and when a brake switch is set at OFF state, and when the vehicle is being decelerated. Further, the automatic-clutch control system decreases an engagement force of the automatic clutch according to an increase of the deceleration and a decrease of a vehicle speed to vary the engagement state.

9 Claims, 4 Drawing Sheets

AUTOMATIC-CLUTCH CONTROL SYSTEM OF AUTOMATIC CLUTCH TYPE TRANSMISSION

BACKGROUND OF THE INVENTION

The present invention relates to an automatic-clutch control system of a transmission with an automatic clutch, which system is arranged to properly control the automatic clutch when a vehicle is decelerated.

Japanese Patent Provisional Publication No. 6-117456 discloses a clutch engagement force control method which realizes a smooth deceleration of a vehicle by controlling an engagement force of an automatic clutch of a transmission according to the lowering of a vehicle speed.

SUMMARY OF THE INVENTION

However, this method of controlling engagement force according to the vehicle speed is further required to ensure a smooth deceleration even under a condition that an accelerator pedal is released during a high-speed traveling condition and under a condition that the accelerator pedal is released when the vehicle was accelerated at a middle gear selected state.

It is therefore an object of the present invention to provide an automatic-clutch control system of an automatic-clutch type transmission which system meets the above-discussed requirements.

An aspect of the present invention resides in an automatic-clutch control system of a transmission with an automatic clutch for a vehicle. The transmission produces a transmission ratio by changing an engagement state of gears in the transmission under an input-power canceled state realized by disengaging the automatic clutch. The automatic-clutch control system comprises a controller which is configured to slip the automatic clutch by decreasing an engagement force of the automatic clutch when a deceleration of the vehicle is greater than or equal to a first predetermined value under a condition that shifting is not being executed.

Another aspect of the present invention resides in an automatic-clutch control system of a transmission for a vehicle, the transmission producing a transmission ratio by changing a fixed state of one of gears to one of input and output shafts in the transmission under an input-power canceled state. The automatic-clutch control system comprises a vehicle operating condition detector that detects an operating condition of the vehicle; an automatic clutch that is capable of continuously varying an engagement state between a crank shaft and the transmission and which is disengaged to realize the input-power canceled state; and a controller that is configured to calculate a deceleration of the vehicle from the vehicle operating condition and to command the automatic clutch to put the engagement state in a slipping state when the deceleration of the vehicle is greater than or equal to a predetermined value.

A further another aspect of the present invention resides in a method of controlling an engagement force of an automatic clutch for connecting a transmission with an engine crankshaft, the method comprises an operation for slipping the automatic clutch by decreasing an engagement force of the automatic clutch when a deceleration of the vehicle is greater than or equal to a first predetermined value under a condition that shifting is not being executed.

The other objects and features of this invention will become understood from the following description with reference to the accompanying drawings.

DETAILED DESCRIPTION OF THE INVENTION

Referring to FIGS. 1 through 5, there is shown an embodiment of a transmission with an automatic clutch 4 and an automatic-clutch control system according to the present invention.

Figure 1:
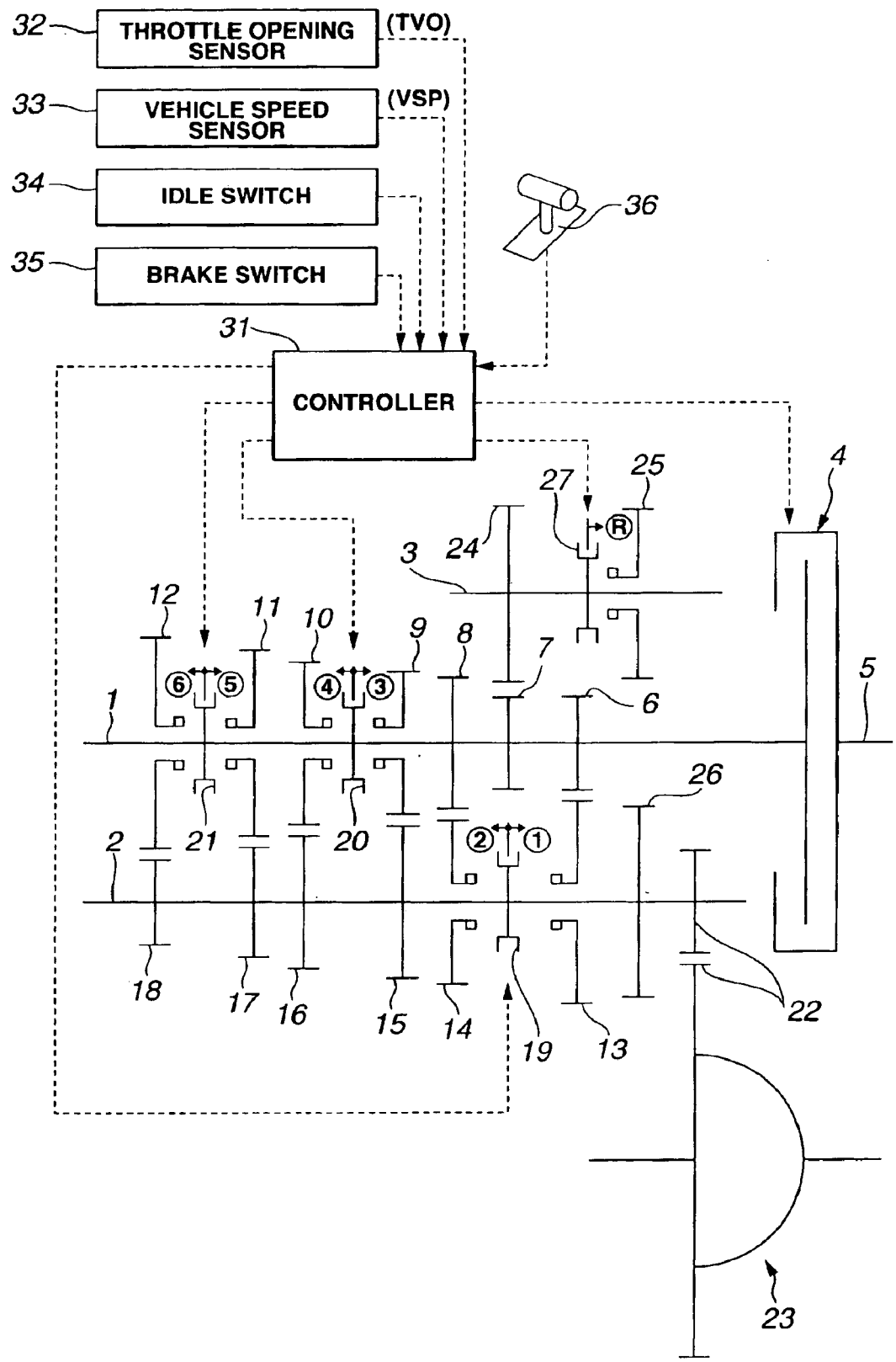
FIG. 1 is a schematic view showing a transmission with an automatic clutch and an automatic-clutch control system of an embodiment according to the present invention.

This transmission is of an automatic-clutch type transmission (gear box) and is employed as a parallel shaft type automatic transaxle for a front-wheel-drive vehicle. The transmission comprises a transmission input shaft 1, a transmission output shaft 2, an idler shaft 3, an input gear set and an output gear set. Input shaft 1, output shaft 2 and idler shaft 3 are arranged in parallel. Although FIG. 1 shows that input, output and idler shafts 1, 2 and 3 are arranged on one plane in order to simply represent the elements of the transmission system, they are practically arranged with the positional relationship shown in FIG. 2.

A first-speed input gear 6, a reverse input gear 7 and a second-speed input gear 8 of the input gear set are fixedly connected to input shaft 1 so as to be located from an end portion of input shaft 1 which is connected and disconnected with an engine crankshaft 5 of an internal combustion engine through an automatic clutch 4 in the order of mention. Further, a third-speed input gear 9, a fourth-speed input gear 10, a fifth-speed input gear 11 and a sixth-speed input gear 12 of the input gear set are rotatably connected to input shaft 1.

A first-speed output gear 13 and a second-speed output gear 14 are rotatably connected to output shaft 2. First-speed output gear 13 is meshed with first-speed input gear 6, and second-speed output gear 14 is meshed with second-speed input gear 8. Further, a third-speed output gear 15, a fourth-speed output gear 16, a fifth-speed output gear 17 and sixth-speed output gear 18 of the output gear set are fixedly connected to output shaft 2, and are meshed respectively with third-speed input gear 9, fourth-speed input gear 10, fifth-speed input gear 11 and sixth-speed output gear 12.

A first synchromesh mechanism is attached to output shaft 2 between first-speed output gear 13 and second-speed output gear 14 of the output gear set. When a coupling sleeve 19 of the first synchromesh mechanism is slid from a neutral position shown in FIG. 1 toward the right-hand side, first-speed output gear 13 is fixedly connected to output shaft 2 by means of a dog-clutch to produce a first-speed selected condition, so that the rotation of input shaft 1 is transmitted to output shaft 2 through first-speed input gear 6 and first-speed output gear 13. When coupling sleeve 19 is slid from the neutral position shown in FIG. 1 toward the left-hand side, second-speed output gear 14 is fixedly connected to output shaft 2 by means of the dog-clutch to produce a second-speed selected condition, so that the rotation of input shaft 1 is transmitted to output shaft 2 through second-speed input gear 8 and second speed output gear 14.

Furthermore, a second synchromesh mechanism is attached to input shaft 1 between third-speed input gear 9 and fourth-speed input gear 10. When a coupling sleeve 20 of the second synchromesh mechanism is slid from a neutral position shown in FIG. 1 toward the right-hand side, third-speed input gear 9 is fixedly connected to input shaft 1 by means of a dog-clutch to produce a third-speed selected condition, so that the rotation of input shaft 1 is transmitted to output shaft 2 through third-speed input gear 9 and third-speed output gear 15. When coupling sleeve 20 is slid from the neutral position shown in FIG. 1 toward the left-hand side, fourth-speed input gear 10 is fixedly connected to input shaft 1 by means of the dog-clutch to produce a fourth-speed selected condition, so that the rotation of input shaft 1 is transmitted to output shaft 2 through fourth-speed input gear 10 and fourth-speed output gear 16.

Furthermore, a third synchromesh mechanism is attached to input shaft 1 between fifth-speed input gear 11 and sixth-speed input gear 12. When a coupling sleeve 21 of the third synchromesh mechanism is slid from a neutral position shown in FIG. 1 toward the right-hand side, fifth-speed input gear 13 is fixedly connected to input shaft 1 by means of a dog-clutch to produce a fifth-speed selected condition so that the rotation of input shaft 1 is transmitted to output shaft 2 through fifth-speed input gear 11 and fifth-speed output gear 17. When coupling sleeve 21 is slid from the neutral position shown in FIG. 1 toward the left-hand side, sixth-speed input gear 12 is fixedly connected to input shaft 1 by means of the dog-clutch to produce a sixth-speed selected condition, so that the rotation of input shaft 1 is transmitted to output shaft 2 through sixth-speed input gear 12 and sixth-speed output gear 18. The rotation of output shaft 2 is inputted to a differential gear device 23 through a final drive gear set 22, and is further distributed from differential gear device 23 to right and left driving wheel.

The explanation of the drivelines of forward first-speed through sixth-speed in the transmission has been discussed in the above. Herein, a driveline of a reverse selected condition will be discussed.

A reverse counter gear 24 is fixedly connected to idler shaft 3 so as to be integrally rotated with idler shaft 3. Reverse counter gear 24 is meshed with reverse input gear 7 mounted on input shaft 1. Further, a reverse idler gear 25 is rotatably provided around idler shaft 3 so as to be located near automatic clutch 4.

A fourth scynchromesh mechanism is provided on idler shaft 3 in the vicinity of reverse idler gear 25. When a coupling sleeve 27 of the fourth scynchromesh mechanism is slide from a neutral position in FIG. 1 toward the right-hand side, reverse idler gear 25 is integrally connected to idler shaft 3 by means of a dog-clutch so that the rotational power is transmitted thereby, and therefore a reverse selected condition is produced so that the rotation of input shaft 1 is transmitted from reverse input gear 7 through reverse counter gear 24, idler shaft 3, reverse idler gear 25 and reverse main gear 26 to output shaft 2.

Although there has been discussed the power transmission function of the automatic clutch type transmission, the shifting of the automatic clutch type transmission is executed in the following manner:

First, input shaft 1 is released from engine crankshaft 5 by disengaging automatic clutch 4 by means of an electromagnetic actuator or hydraulic actuator. Second, the one of coupling sleeves 19, 20, 21, and 27 corresponding to a target shift position adapted to the traveling condition is automatically stroked in the corresponding direction by means of an electromagnetic actuator or hydraulic actuator under the input-shaft released condition so as to produce a desired transmission ratio. Then, transmission input shaft is connected to engine crankshaft 5 by engaging the automatic clutch 4.

A controller 31 executes the stroke control of automatic clutch 4 and coupling sleeves 19, 20, 21 and 27 by supplying a control signal to each actuator for each of automatic clutch 4 and coupling sleeves 19, 20, 21 and 27. In FIG. 1, in order to avoid excessive complication of the drawing, it is described that control signal lines of controller 31 are directly connected to automatic clutch 4 and coupling sleeves 19, 20, 21 and 27.

Further, as shown in FIG. 1, controller 31 is electronically connected to a throttle opening sensor 32 for detecting a throttle opening TVO, a vehicle speed sensor 33 for detecting a vehicle speed VSP, an idle switch 34 for outputting an on signal when an accelerator pedal is put in a completely released state, a brake switch 35 for detecting a driver's braking operation, and a shift lever device 36 manipulated by a driver, so as to receive various information therefrom and to output a shift control signal to automatic clutch 4 and coupling sleeves 19, 20, 21 and 27 through actuators.

Shift lever device 36 has a function for selecting one of a manual shift mode for controlling the transmission as a manual transmission and an automatic shift mode for controlling the transmission as an automatic transmission. Further, shift lever device 36 functions as a manual shift lever when the manual shift mode is selected and functions as a range select lever for selecting one of P (parking), R (reverse), N (neutral), D (drive) and $D_S$ (gear-selected drive range such as $D_1$ or $D_2$).

Controller 31 selects a suitable shift position on the basis of throttle opening TVO and vehicle speed VSP, and executes shifting from the present shift position to the selected shift position as discussed above. Further, controller 31 executes an engagement force control of automatic clutch 4 by processing a control program shown in FIG. 3.

At step S1, controller 31 determines whether or not shifting of the transmission is now being executed. When the determination at step S1 is affirmative, the routine proceeds to step S5. That is, controller 31 determines that it is not necessary to execute the engagement force control of automatic clutch 4 when the shifting is being executed. Therefore, the routine proceeds to step S5 wherein controller 31 calculates a target clutch transmission torque during shifting. Then, at step S6 subsequent to the execution at step S5, controller 31 sets a command clutch transmission torque at the target clutch transmission torque during shifting so that the engagement force of automatic clutch 4 is controlled to bring the clutch transmission torque closer to the target clutch transmission torque. The command clutch transmission torque corresponds a command value of the engagement force of automatic clutch 4 and is outputted from controller 31 to actuator of automatic clutch 4. Herein, the target clutch transmission torque during shifting is gradually increased so as to suppress a shift shock and a shift delay. When the determination at step S1 is negative, the routine proceeds to step S2.

At step S2 subsequent to the negative determination at step S1, controller 31 determines whether the automatic shift mode of the transmission is selected or not. When the determination at step S2 is affirmative, the routine proceeds to step S3. When the determination at step S2 is negative, the routine proceeds to step S7.

At step S3 subsequent to the affirmative determination at step S2, controller 31 determines whether idle switch 34 is set at ON state or not, that is, controller 31 determines whether or not the vehicle is put in a coast traveling condition wherein the accelerator pedal is put in a released state. When the determination at step S3 is affirmative, the routine proceeds to step S4. When the determination at step S3 is negative, the routine proceeds to step S7.

At step S4 subsequent to the affirmative determination at step S3, controller 31 determines whether brake switch 35 is set at OFF state or not, that is, controller 31 determines whether or not the driver is not executing a braking operation by depressing a brake pedal. When the determination at step S4 is affirmative, the routine proceeds to step S8. When the determination at step S4 is negative, the routine proceeds to step S7.

When at least one of steps S2, S3 and S4 made the negative determination, controller 31 determines that it is not necessary to execute the engagement force control for justifying the deceleration. Therefore, the routine proceeds to step S7 wherein controller 31 sets the command clutch transmission torque at a transmission torque capacity of a clutch full engagement state so that engagement force of automatic clutch 4 is controlled to bring the transmission torque closer to the command cutch transmission torque set at the full engagement value.

When controller 31 determines at step S1 that the shifting is not being executed, when controller 31 determines as step S2 that the automatic shift mode is being selected, when controller 31 determines at step S3 that idle switch 34 is set at ON state, and when controller 31 determines at step S4 that brake switch 35 is set at OFF state, the routine proceeds to step S8 wherein controller 31 determines whether the vehicle is being decelerated or not. When the determination at step S8 is negative, that is, when the vehicle is not being decelerated, controller 31 determines that it is not necessary to execute the engagement force control of automatic clutch 4 for justifying the deceleration. Therefore, the routine proceeds to step S7. When the determination at step S8 is affirmative, that is, when the vehicle is being decelerated, controller 31 executes the engagement force control of automatic clutch 4 according to the present invention. Therefore, the routine proceeds to step S9.

At step S9, controller 31 calculates the deceleration $\alpha$ of the vehicle from a variation of vehicle speed VSP with respect to time. The deceleration $\alpha$ may be directly detected from a longitudinal acceleration sensor.

Figure 4:
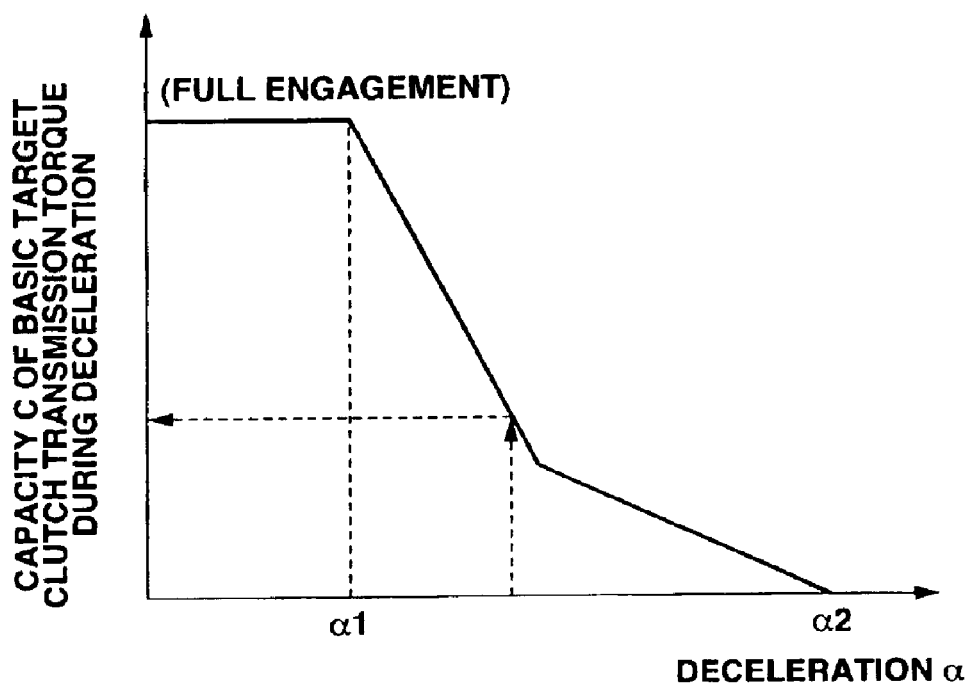
FIG. 4 is a graph showing a change of a basic target transmission torque capacity of the automatic clutch during deceleration.

At step S10 subsequent to the execution of step S9, controller 31 retrieves a capacity C of the basic target clutch transmission torque during the deceleration condition, on the basis of a map shown in FIG. 4 and from deceleration $\alpha$ obtained at step S9. Herein, the capacity C of the basis target clutch transmission torque during the deceleration condition is decreased by slipping automatic clutch 4 to lower the engagement force of automatic clutch 4 when the deceleration $\alpha$ is greater than a preset deceleration $\alpha1$, as shown in FIG. 4. This arrangement prevents the engine from generating an excessive engine brake which applies a strange feeling to vehicle occupants. Accordingly, capacity C of the basic target clutch transmission torque during the deceleration condition is set to be largely decreased from preset deceleration $\alpha1$ to an intermediate point between preset decelerations $\alpha1$ and $\alpha2$ according to the increase of the deceleration. Then, the decreasing degree of the capacity C is decreased between the intermediate point and the set deceleration $\alpha2$. Further, capacity C is becomes zero to completely disengage automatic clutch 4 when deceleration $\alpha$ becomes the preset deceleration $\alpha2$.

Figure 5:
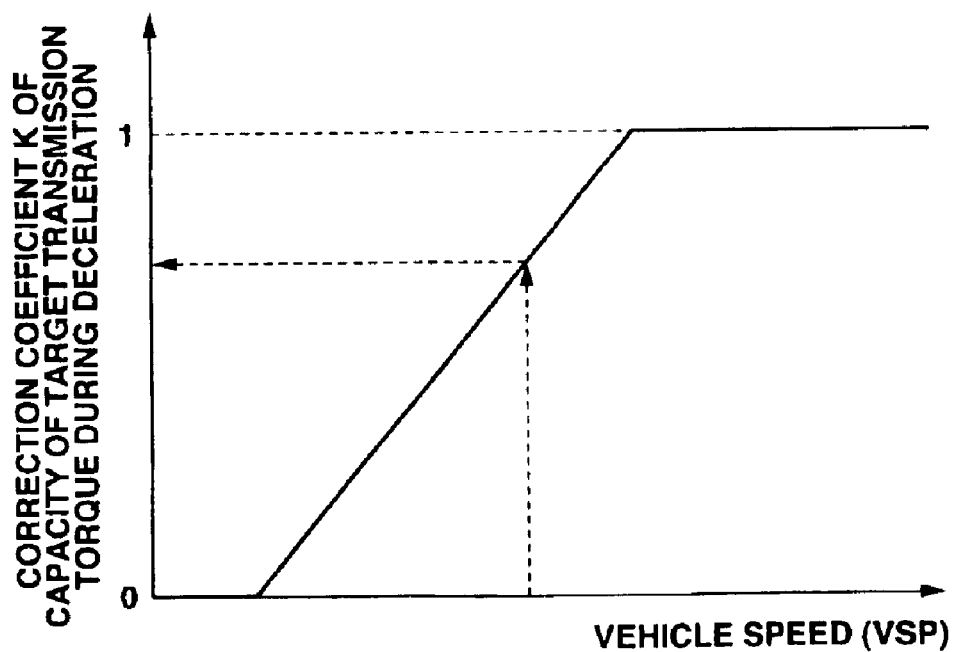
FIG. 5 is a graph showing a correction coefficient of the basic target transmission torque capacity of the automatic clutch.

At step S11, controller 31 retrieves a correction coefficient K of capacity C of the target clutch transmission torque during the deceleration condition, on the basis of a map shown in FIG. 5 and from vehicle speed VSP. As is clearly shown in FIG. 5, correction coefficient K is linearly decreased according to the decrease of vehicle speed VSP, that is, correction coefficient K is set so that the decreased quantity of capacity C is increased according to the decrease of vehicle speed VSP. This setting of correction coefficient K enables a smooth deceleration of the vehicle at a low speed running while preventing rattly or clunky vibrations.

At step S12, controller 31 calculates the target clutch transmission torque by multiplying capacity C and correction coefficient K.

At step S13, controller 31 sets the command clutch transmission torque at the target clutch transmission torque during the deceleration condition, and executes the engagement force control to bring the transmission torque of automatic clutch 4 closer to the command clutch transmission torque.

Figure 3:
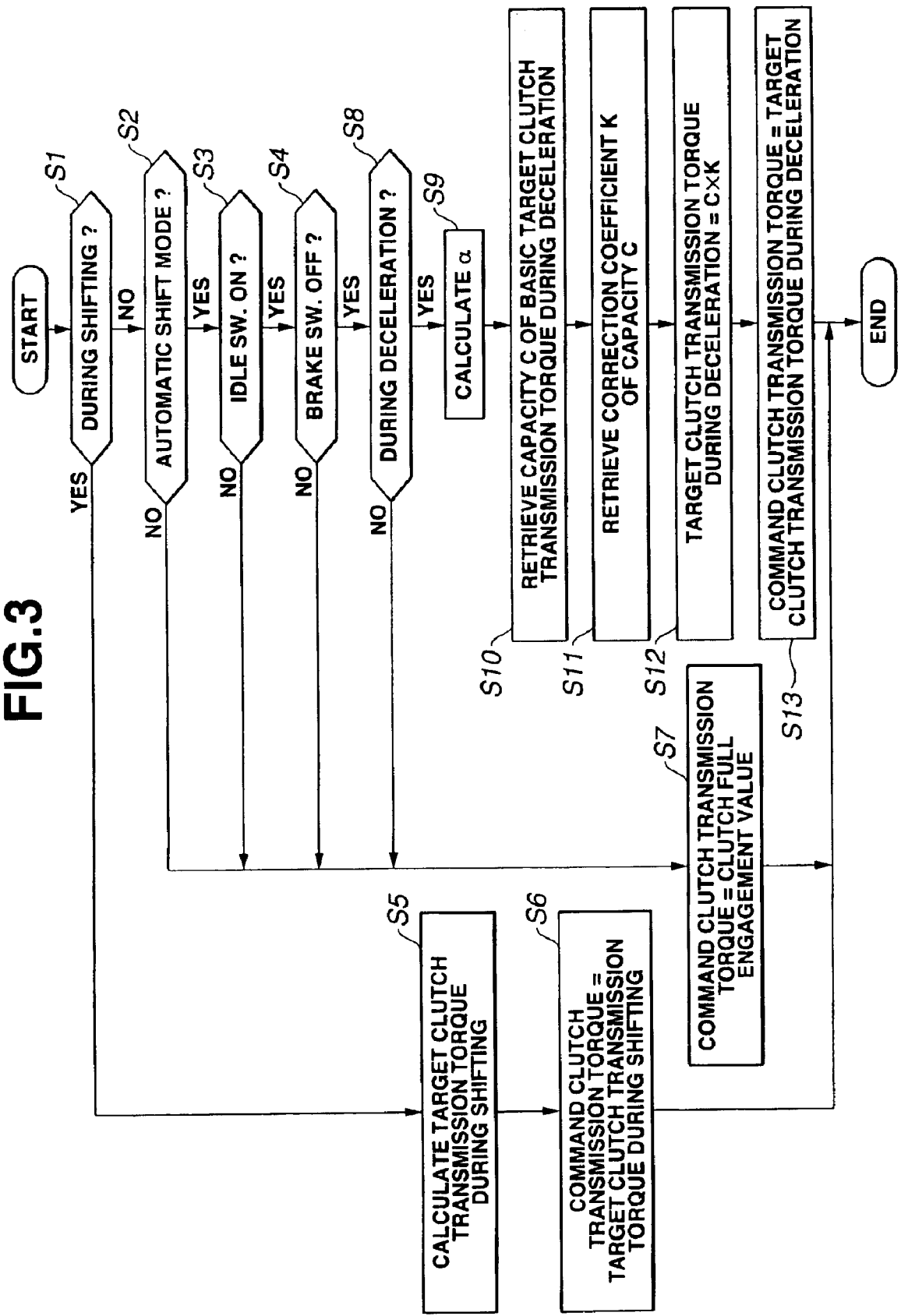
FIG. 3 is a flowchart showing a control program of the automatic-clutch control system of the embodiment according to the present invention.

With the engagement force control during the deceleration condition, which control is executed by steps S9 through S13 in FIG. 3, when vehicle deceleration $\alpha$ is greater than or equal to preset deceleration $\alpha1$ under a non-shifting state, automatic clutch 4 is put in a slip state by decreasing the engagement force of automatic clutch 4 as shown in FIG. 4. Accordingly, even if the vehicle travels at high speed, this engagement-force decreasing control is firmly executed under a condition that vehicle deceleration $\alpha$ is greater than or equal to preset deceleration $\alpha1$ under a non-shifting state. This slipping operation of automatic clutch 4 prevents the engine brake from becoming excessively large, and therefore the vehicle occupants become free from the strange feeling due to excessive engine brake.

With the thus arranged system of this embodiment according to the present invention, as shown in FIG. 4, the decreased degree of the engagement force of automatic clutch 4 becomes large as the deceleration becomes larger, and finally automatic clutch 4 is fully disengaged (released) when the deceleration $\alpha$ becomes greater than or equal to preset deceleration $\alpha1$. Therefore, even under a condition that engine brake is increasing due to the deceleration $\alpha$, the control system according to the present invention firmly prevents the excessive engine brake from becomes excessively large, and ensures the functional advantage under the whole deceleration conditions.

Furthermore, the present invention is arranged such that the decreased quantity of the engagement force of automatic clutch 4 is increased according to the lowering of the vehicle speed, the engagement force of automatic clutch 4 decreases as the vehicle speed VSP decreases so as to increase a slipping quantity of automatic clutch 4. Therefore, the control system ensures a smooth deceleration under a low speed vehicle traveling condition without generating discomfort vibrations of the vehicle.

Additionally, the control system according to the present invention is arranged such that the engagement force lowering control of automatic clutch 4 is not executed when the driver is executing a braking operation by the execution of step S4 in FIG. 3. This arrangement prevents the improper engine-brake decreasing control when the driver is executing a braking operation from the feeling that the total braking force of the vehicle cannot be achieved only by the engine brake.

Figure 2:
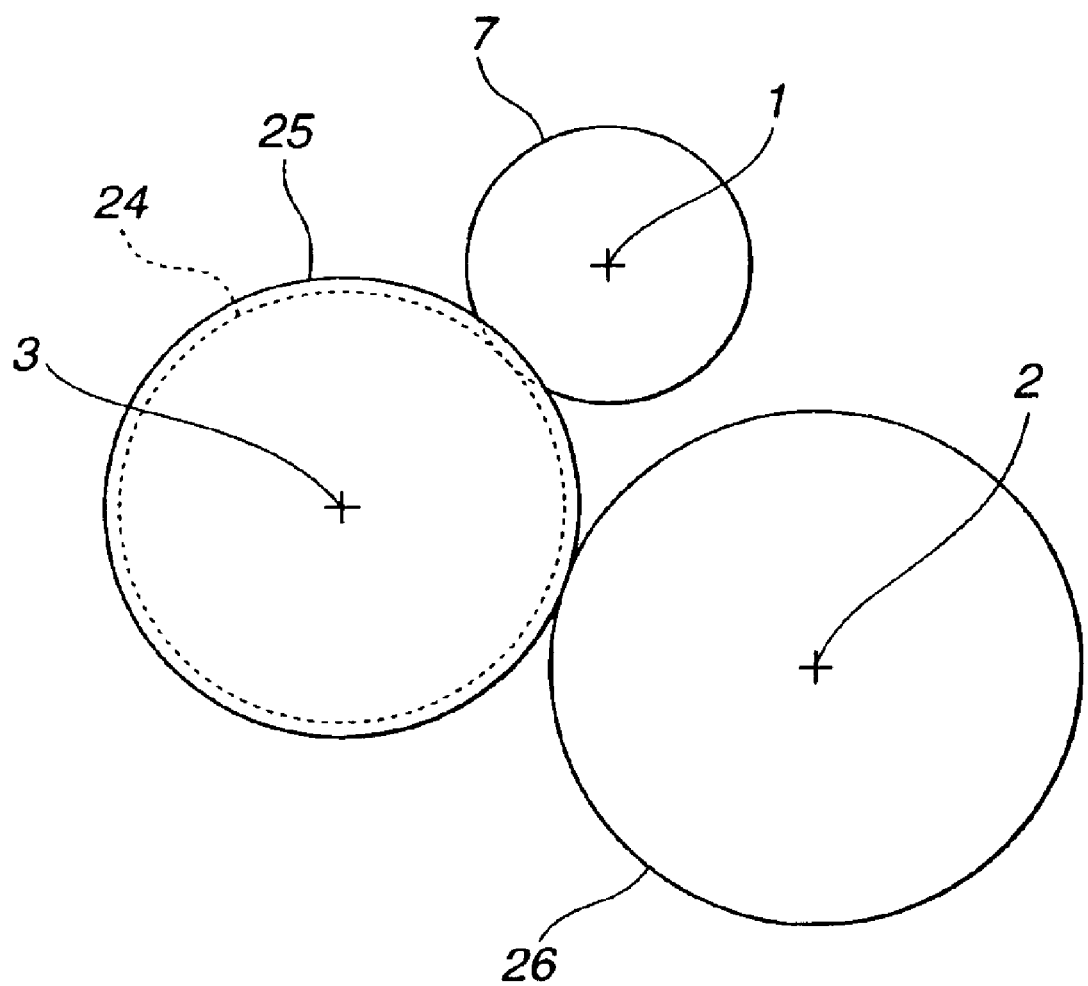
FIG. 2 is an explanatory view showing a positional relationship among an input shaft, an output shaft and an idler shaft of the transmission of FIG. 1.

Although the embodiment according to the present invention has been shown and described such that the idea of the present invention is adapted to the parallel shaft type transmission as shown in FIGS. 1 and 2, this idea of the present invention may be applied to various transmissions with an automatic clutch, and such application to various transmissions will also ensure the functional advantaged gained by the above-discussed transmission.

This application is based on Japanese Patent Application No. 2001-323235 filed on Oct. 22, 2001 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An automatic-clutch control system of a transmission with an automatic clutch for a vehicle, the transmission producing a transmission ratio by changing an engagement state of gears in the transmission under an input power canceled state realized by disengaging the automatic clutch, the automatic-clutch control system comprising:
   a controller configured to slip the automatic clutch by decreasing an engagement force of the automatic clutch when the vehicle is put in a coast traveling condition and a deceleration of the vehicle is greater than or equal to a first predetermined value under a condition that shifting is not being executed,
   wherein the controller is configured to decrease the engagement force of the automatic clutch according to an increase of the deceleration of the vehicle, and the controller is configured to disengage the automatic clutch when the vehicle is put in a coast traveling condition and when the deceleration of the vehicle is greater than or equal to a second predetermined value, which is greater than the first predetermined value.

2. The automatic-clutch control system as claimed in claim 1, wherein the controller is configured to increase a decrease of the engagement force of the automatic clutch per the deceleration of the vehicle according to a decrease of a vehicle speed of the vehicle.

3. The automatic-clutch control system as claimed in claim 1, wherein the controller is configured to prohibit decreasing the engagement force of the automatic clutch when the driver is executing a braking operation.

4. The automatic-clutch control system as claimed in claim 1, further comprising a vehicle operating condition detector that detects an operating condition of the vehicle, the controller being configured to calculate a deceleration of the vehicle from the vehicle operating condition.

5. An automatic-clutch control system of a transmission with an automatic clutch for a vehicle, the transmission producing a transmission ratio by changing an engagement state of gears in the transmission under an input power canceled state realized by disengaging the automatic clutch, the automatic-clutch control system comprising:
   a controller configured to slip the automatic clutch by decreasing an engagement force of the automatic clutch when a deceleration of the vehicle is greater than or equal to a first predetermined value under a condition that shifting is not being executed,
   wherein the controller is configured to calculate the deceleration of the vehicle when the shifting is not being executed, when an automatic shift mode is being selected, when idle switch is set at ON state, and when a brake switch is set at OFF state, and when the vehicle is being decelerated, wherein the controller determines a command clutch transmission torque on the basis of a map stored in the controller and the calculated deceleration and a vehicle speed detected by a vehicle operating condition detector.

6. An automatic-clutch control system of a transmission for a vehicle, the transmission producing a transmission ratio by changing a fixed state of one of gears to one of input and output shafts in the transmission under an input-power canceled state, the automatic-clutch control system comprising:
   a vehicle operating condition detector detecting an operating condition of the vehicle;
   an automatic clutch which is capable of continuously varying an engagement state between a crank shaft and the transmission, the input-power canceled state being realized by disengaging the automatic clutch; and
   a controller configured to calculate a deceleration of the vehicle from the vehicle operating condition and to command the automatic clutch to put the engagement state in a slipping state when the vehicle is put in a coast traveling condition and when the deceleration of the vehicle is greater than or equal to a first predetermined value, and
   wherein the controller is configured to decrease the engagement force of the automatic clutch according to the increase of the deceleration of the vehicle, and the controller is configured to disengage the automatic clutch when the vehicle is put in a coast traveling condition and when the deceleration of the vehicle is greater than or equal to a second predetermined value, which is greater than the first predetermined value.

7. The automatic-clutch control system as claimed in claim 6, wherein the controller decreases an engagement force of the automatic clutch according to an increase of the deceleration and a decrease of a vehicle speed of the vehicle to vary the engagement state.

8. A method of controlling an engagement force of an automatic clutch for connecting a transmission with an engine crankshaft, the method comprising:
   slipping the automatic clutch by decreasing an engagement force of the automatic clutch when the vehicle is put in a coast traveling condition and when a deceleration of the vehicle is greater than or equal to a first predetermined value under a condition that shifting is not being executed, and
   decreasing the engagement force of the automatic clutch according to an increase of the deceleration of the vehicle, and disengaging the automatic clutch when the vehicle is put in a coast traveling condition and when the deceleration of the vehicle is greater than or equal to a second predetermined value, which is greater than the first predetermined value.

9. An automatic-clutch control system of a transmission with an automatic clutch for a vehicle, the transmission producing a transmission ratio by changing an engagement state of gears in the transmission under an input-power canceled state realized by disengaging the automatic clutch, the automatic-clutch control system comprising:

control means for controlling an engagement force of the automatic clutch so as to slip the automatic clutch when the vehicle is put in a coast traveling condition and when a deceleration of the vehicle is greater than or equal to a first predetermined value under a non-shifting states, wherein the control means is configured to decrease the engagement force of the automatic clutch according to an increase of the deceleration of the vehicle, and the control means is configured to disengage the automatic clutch when the vehicle is nut in a coast traveling condition and when the deceleration of the vehicle is greater than or equal to a second predetermined value, which is greater than the first predetermined value.

* * * * *